United States Patent [19]

Heemstra

[11] Patent Number: 4,488,113

[45] Date of Patent: Dec. 11, 1984

[54] MAGNETIC BRIDGE PROXIMITY SENSOR

[75] Inventor: Frank W. Heemstra, Fort Washington, Md.

[73] Assignee: The United States of America as represented by the Secretary of the Navy, Washington, D.C.

[21] Appl. No.: 398,500

[22] Filed: Jul. 15, 1982

[51] Int. Cl.$^3$ .......................... G01B 7/14; G01R 33/00
[52] U.S. Cl. .................................... 324/207; 324/228; 324/234
[58] Field of Search ............... 324/207, 208, 228, 234, 324/235, 239; 361/180; 340/686

[56] References Cited

U.S. PATENT DOCUMENTS

| | | | |
|---|---|---|---|
| 3,366,874 | 1/1968 | Kühne | 324/207 X |
| 3,403,329 | 9/1968 | Geyger . | |
| 3,491,289 | 1/1970 | Petrini . | |
| 3,575,616 | 4/1971 | Jordan | 324/208 X |
| 3,662,257 | 5/1972 | Fujiwara . | |
| 4,013,945 | 3/1977 | Grosso . | |
| 4,066,962 | 1/1978 | Jaffe | 324/208 |
| 4,205,266 | 5/1980 | Lichtenberg . | |
| 4,271,763 | 6/1981 | Berger . | |

FOREIGN PATENT DOCUMENTS

| | | | |
|---|---|---|---|
| 45953 | 4/1977 | Japan | 324/207 |
| 909023 | 10/1962 | United Kingdom | 324/207 |

Primary Examiner—Gerard R. Strecker
Attorney, Agent, or Firm—Robert F. Beers; William T. Ellis

[57] ABSTRACT

A proximity sensor for indicating the spatial proximity of a ferrous object comprising a magnetic reluctance bridge formed from a plurality of high and low permeability sections and with a ring core flux gate magnetometer disposed therebetween to form the center reluctance path of the bridge in order to sense flux when the bridge is unbalanced, a dc magnetic field generator disposed along a line of symmetry for the bridge for providing magnetic flux in the bridge, wherein a ferrous object disposed adjacent one of the low permeability sections will unbalance the bridge and cause flux to be detected by the flux gate magnetometer, and further including circuitry for generating a triggering signal when flux is detected by the magnetometer.

5 Claims, 7 Drawing Figures

MAGNETIC BRIDGE PROXIMITY SENSOR

BACKGROUND OF THE INVENTION

The present invention relates generally to proximity sensing devices, and more particularly to magnetic proximity sensors which utilize dc fields.

Proximity sensors are designed to indicate the spatial proximity of a ferrous object or "target". Such proximity sensors are utilized to indicate, for example, the mechanical status of movable parts in machinery, to give an indication of when an elevator is at a predetermined level, and to indicate when a hatch or a door is opened or closed.

There are a variety of proximity sensing devices currently utilized in the art. These devices include mechanical contact switches, magnetically activated mechanical switches, photoelectric detectors, and ac electromagnetic detectors. Each of these proximity sensing devices has certain disadvantages. For example, the mechanical contact switches are susceptible to mechanical damage, corrosion, and fouling by dirt and water. They are not generally favored when reliable, low maintenance, and long life are primary considerations. The magnetically activated mechanical switches (such as magnetic reed switches) eliminate some of the above disadvantages because they avoid direct contact with machinery parts and can be hermetically sealed. However, such switches are difficult to immunize against the effects of shock and vibration. Photoelectric detectors, although having a variety of operational advantages, are not suitable for use in environments where the optical window may easily become fouled by dirt and grease or painted by maintenance personnel. The optical sensor used in such photo-electric detectors may also be rendered inoperative by smoke. This is a serious disadvantage when the detector is being used aboard a naval vessel to sense such items as the status of an elevator or the status of a hatch.

The ac electromagnetic detectors make use of the electromagnetic interaction between alternating magnetic fields and objects of high conductivity, or high magnetic permeability. Included among these detectors are metal locators, eddy current sensors, and variable reluctance devices. Although the operation of these sensors is uninhibited by the presence of non-ferrous insulating materials between the sensor and the object to be detected, the ac field will not easily pass through conductors because of the electromagnetic interaction. Thus, since the electromagnetic fields must be allowed to penetrate the sensor for target detection, the sensor cannot be shielded against interference by spurious electromagnetic fields or radiation from such sources as radio transmitters, radar, power lines, etc.

The present design is directed to a magnetic proximity sensor which utilizes a dc magnetic field in its sensing operation. The use of such a dc magnetic field is attractive because the quasi-stationary magnetic field penetrates unimpaired through conductors and insulators alike, and any nonferrous material is transparent to the field. In contrast to devices using alternating fields which must be allowed to penetrate for detection, a dc magnetic detector can be made virtually impervious to all but very low-frequency electromagnetic radiation by using conductive shielding.

A further advantage of the use of this type of sensor is that it has no moving parts, and thus can be more easily immunized against the effects of shock and vibration than magnetically actuated mechanical switches. Moreover, along with other magnetic sensors but in contrast to devices using optical windows, the operation of a dc magnetic proximity sensor is unimpaired by dirt, paint or grease. Additionally, since the source of the dc field may be a permanent magnet connections and can be made very strong compared to ac electromagnetic sources. Finally, the dc magnetic field is a vector quantity whose direction and sense is determined by geometry rather then source intensity. Thus, it is possible to use the directional properties of the field to determine the geometrical relationships between a magnetic target and the detector independently of the sensitivity of the detector or the strength of the source.

OBJECTS OF THE INVENTION

Accordingly, it is an object of the present invention to provide a proximity sensor which utilizes dc magnetic flux as the property to be detected in determining the position of a target.

It is a further object of the present invention to provide a magnetic field sensing device which is sensitive to the sense as well as to the amplitude of the field.

It is yet a further object of the present invention to provide a magnetic proximity sensor capable of indicating sharply defined positions along a target's line of travel where the field component sensed by the device reverses direction.

It is a further object of the present invention to provide a magnetic proximity sensor which can be conductively shielded without impairing its operation and is easily immunized against the effects of shock and vibration.

Other objects, advantages, and novel features of the present invention will become apparent from the detailed description of the invention, which follows the summary.

SUMMARY OF THE INVENTION

Briefly, the present invention resides in the use of a magnetic reluctance bridge with a special magnetic flux sensing element disposed to form the center reluctance path in the bridge, in combination with a dc magnetic field generating device. The bridge comprises a plurality of sections with high magnetic permeability in combination with a plurality of low magnetic permeability gaps arranged in symmetrical balance in relation to the dc field generating device to form the outer flux paths of a balanced magnetic reluctance bridge for the magnetic flux from the dc field generating device. The magnetic flux sensing element is disposed within the symmetrically arranged metallic sections to form the center reluctance path for the magnetic reluctance bridge in order to sense flux when the magnetic reluctance bridge is unbalanced in reluctance. Accordingly, when a ferrous object is disposed adjacent one of the balanced low magnetic permeability gaps, it will unbalance the magnetic reluctance bridge and cause flux to be detected by the flux sensing element. The signal from this flux sensing element may then be applied to the trigger signal generator to generate a triggering signal to indicate the proximity of the ferrous object to be detected.

In a preferred embodiment, the flux sensing element may be comprised of a ring core flux gate magnetometer.

In one embodiment, the dc magnetic field generating means may comprise a device having two magnetic poles with an axis of symmetry therebetween. The plurality of sections may comprise a first metallic section disposed in a non-touching manner across the magnetic poles of the dc field generating device and balanced relative to its axis of symmetry, and a second metallic section disposed in parallel with the first metallic section a predetermined distance therefrom to permit the ring core flux gate magnetometer to be disposed therebetween and balanced relative to the axis of symmetry.

The ring core flux gate magnetometer utilized in the preferred embodiment may comprise a ring core, an ac generator for generating a signal of frequency $f_o$, a plurality of energizing coils symmetrically wound around the ring core and connected to an ac generator, and a plurality of detector coils wound symmetrically around the ring core and connected to the trigger signal generating device. Such ring core flux gate magnetometers are generally designed to generate a second harmonic of the frequency $f_o$ for detecting a target. Accordingly, the trigger signal generator of the present design includes a second harmonic bandpass filter tuned to the second harmonic frequency $2f_o$ for filtering the signal induced in the detecting coils, a second harmonic generator connected to the ac generator for generating a reference second harmonic, a phase detector for detecting the phase of the signal output from the second harmonic with reference to the reference second harmonic, and an output circuit for generating a trigger signal in response thereto.

DETAILED DESCRIPTION OF PREFERRED EMBODIMENT

The present magnetic proximity sensor is designed to detect ferrous targets (iron or steel) which are not permanently magnetized (except for small residual magnetism). This design incorporates an internal dc magnet which creates an induced magnetization in the target. Proximity of the target is then sensed by changes in a component of the magnetic field due to the induced field of the target. The present magnetic proximity sensor is made sensitive to small changes resulting from the induced field by a geometrical arrangement of the magnet, a field sensitive element, and certain high magnetic permeability sections which act to cancel the direct effect of the magnet on the field sensitive element. The geometrical arrangement of the dc magnetic field generating device, the field sensitive element, and the high magnetic permeability sections is designated a magnetic reluctance bridge.

Figure 1:
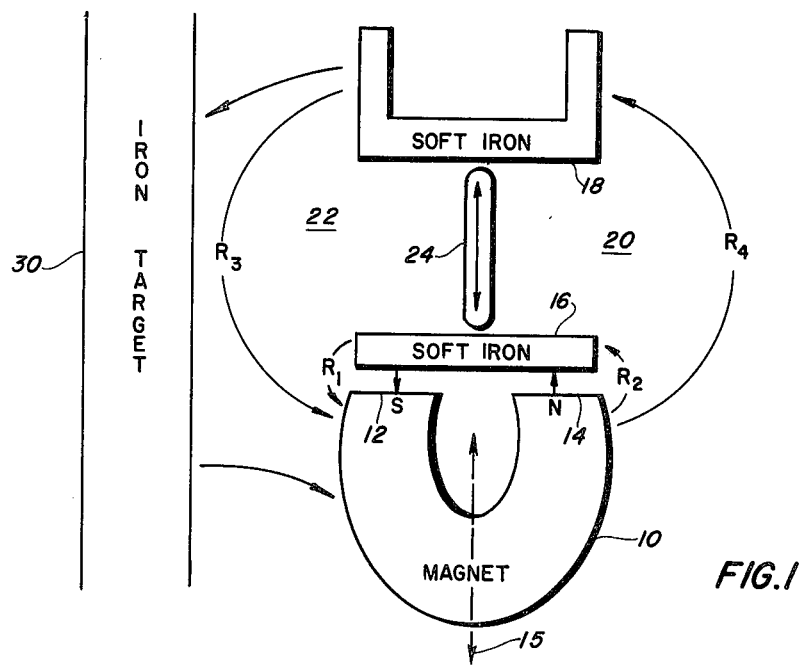
FIG. 1 is a schematic diagram of one embodiment of the magnetic reluctance bridge that may be utilized in the present invention.

Referring now to the drawings, where in like reference characters designate like or corresponding parts throughout the views, FIG. 1 shows one embodiment of the magnetic reluctance bridge of the present invention. This magnetic reluctance bridge comprises a plurality of high magnetic permeability sections in combination with a plurality of low magnetic permeability gaps arranged in symmetrical balance in relation to a dc field generating device 10. The dc field generating device shown in FIG. 1 is simply a horseshoe magnet with poles 12 and 14. It is of course understood that there are a wide variety of dc magnetic field generating devices, with permanent magnets or other wise. which could be utilized in the present design. The magnetic reluctance bridge comprises a plurality of high magnetic permeability sections 16 and 18 disposed in symmetrical balanced relative to the axis of symmetry 15 of the poles 12 and 14 of the magnet 10. The high magnetic permeability sections 16 and 18 may be made of soft iron, by way of example. The first metallic section 16 is disposed in a non touching manner across the two magnetic poles 12 and 14 and balanced relative to the axis of symmetry 15. Likewise, the second metallic section 18 is disposed in parallel with the first metallic section 16 a predetermined distance therefrom to permit a flux sensing element 24 to be disposed therebetween. This second metallic section 18 is again balanced relative to the axis of symmetry 15. In the areas 20 and 22 on either side of the two high magnetic permeability sections 16 and 18, there are low magnetic permeability gaps. In the present design these gaps are realized simply by air gaps. These air gaps 20 and 22 are also symmetrical with respect to the axis of symmetry 15 of the poles 12 and 14.

As noted above, flux sensing device 24 is disposed between the two high magnetic permeability sections 16 and 18 for sensing magnetic flux flowing thereacross.

It can be seen that magnetic flux paths $R_1$ and $R_2$ will be setup between the poles 12 and 14 and the high permeability section 16. Likewise, magnetic flux paths $R_3$ and $R_4$ will be setup between the poles 12 and 14 and the high permeability section 18. The magnetic reluctance bridge comprising the high permeability sections 16 and 18 and the low permeability gaps 20 and 22 is in balance when the reluctance $R_1$ has the same ratio to the reluctance $R_2$ as the reluctance $R_3$, has to the reluctance $R_4$. In such a condition of balance, the magnetic flux passing through the center flux sensing element 24 in one direction from one of the poles of the magnet 10 will exactly equal the magnetic flux passing in the opposite direction from the other pole of the magnet. Thus, the resultant magnetic flux passing through the magnetic flux sensing element 24 in a condition of balance will be approximately 0.

The proximity of a ferrous target 30, as shown in FIG. 1, decreases the reluctance $R_3$ of the low magnetic permeability gap 22 nearest the target. This decrease of the reluctance $R_3$ unbalances the bridge thereby causing magnetic flux to pass through the center of the flux sensing element 24. The flux sensing element 24 will, in turn, provide a flux indication.

It should be noted that the magnetic flux passing through the flux sensing element 24 may be nulled to obtain balance of the bridge by sliding the high permeability section 16 laterally in front of the magnets poles 12 and 14 thereby adjusting the reluctance ratio, $R_1/R_2$. It is understood, of course, that the bridge is normally balanced when no iron or steel is near by.

If the low magnetic permeability gap 20 of the sensor is disposed near a steel or other ferrous material bulkhead mounting plate, the bridge is unbalanced in the reverse direction unless the target 30 is closer to the sensor than the mounting plate. or the magnetic permeabilities thereof are significantly different. However, because applicants' magnetic reluctance bridge with its attendant electronic processing (to be discussed later) is sensitive to the sign (sense) as well as the amplitude of the magnetic field, the device will not be activated by ferrous materials in this low magnetic permeability gap 20. Thus, the only affect of ferrous material in this gap 20 is that the required target range is decreased to a distance less than the distance to the ferrous material in the gap 20.

It should be noted, that the ferrous target 30 may be magnetized. The field from this magnetized target will then be superimposed on the field of the internal magnet by vector addition. Targets having permanent magnetism can be used to increase the detection range of the device. However, as noted above, magnetized targets must have the correct magnetic orientation to activate the present device.

The magnetic reluctance bridge of the present device is sensitive to all magnetic fields of external origin. Thus, this device will be affected by the ever present magnetic field of the Earth. The intensity of this field thus sets a limit to the allowed magnetic field sensitivity of the proximity switch because the switch must not be activated by the Earth's magnetic field in any orientation.

Since the magnetic moment of the internal magnet 10 determines the induced magnetization of the target 30 at a given distance, the response of the device can be increased simply by using a stronger internal magnet. Although a small horse shoe magnet was used in the present design shown in FIG. 1, a variety of other magnetic devices could be utilized such as, for example, a heavier bar magnet. In order to reduce the magnetic memory effects (residual magnetism) resulting from exposure to strong external fields, the high magnetic permeability sections 16 and 18 can be made from ferrous materials having low retentivity, such as transformer iron.

Figure 2A:
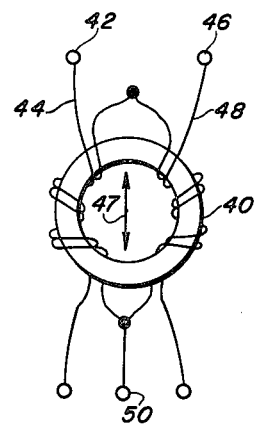
FIG. 2(a) is a diagram of one type of winding arrangement which may be utilized on the ring core flux gate magnetometer in the preferred embodiment.
Figure 2B:
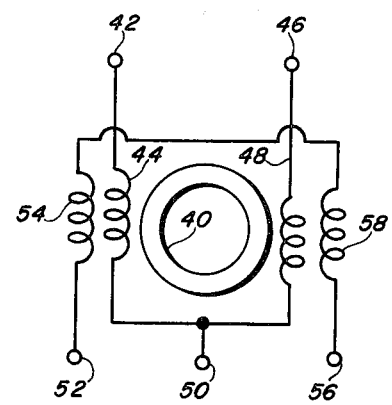
FIG. 2(b) is a schematic representation of the winding arrangement shown in FIG. 2(a).

Referring now to the magnetic flux sensing device 24, it may be implemented utilizing a number of different flux sensing configurations. However. in the preferred embodiment, a ring core flux-gate magnetometer is utilized. The basic theory for such a magnetometer is disclosed in U.S. Pat. No. 3,403,329 by W. A. Geyger. The winding arrangement for such a design is shown in FIG. 2(a) and a schematic representation thereof is shown in FIG. 2(b). In this design, the flux sensing element 24 comprises a toroidal core 40 with a set of energizing coils 44 and 48 and a set of detecting coils 54 and 58 disposed thereon. The excitation windings 44 and 48 are disposed on each semicircular side of an arbitrary diametrical axis 47 of the core 40 and are symmetrically spaced with respect to this axis. These coils are connected to an ac voltage generator (shown in FIG. 4 and FIG. 5). The polarity or phasing of the connections of these excitation windings is such that the magnetizing fields of the two coils aid each other to circularly magnetize the ring core 40.

Likewise, a pair of detector windings 54 and 58, symmetrically disposed on each semicircular side of the axis 47, is connected in series opposition so that the voltages induced therein by the excitation flux in the core 40 cancel in the detector winding circuit.

A variety of other winding arrangements are possible on the toroidal core 40. The only requirement is that symmetry is maintained with respect to a given axis and that the correct phasing and polarity of the connections are maintained. In this regard, the excitation windings must aid each other in magnetizing the toroidal core, while the detector windings must oppose each other in the detector circuit.

When the windings 44 and 48 are energized by the ac voltage, the voltage induced in the excitation windings by the rate of change of flux in the core 40 is approximately equal to the applied voltage. This is because of the low coil resistance and core reluctance. The quantity of magnetic flux of induction threading the coils is, therefore, the time integral of the voltage per turn of the excitation windings.

In this sensing head design, the excitation voltage per turn and the ac frequency are chosen such that the flux density (the time integral noted above, divided by the cross-sectional area of the core) reaches the saturation flux density of the core material near the mid point of each half cycle of the ac excitation voltage. (For practical purposes the saturation flux density may be regarded as the maximum flux density that the core of a given material will hold.) When the saturation density is reached for the core 40, the flux will no longer increase inside the core and thus the voltage across the windings drops to 0. The supply voltage is then dropped across a pair of current limiting resistors to be discussed later.

If an external magnetic field having a component along the axis of symmetry 47 exists, it will act to strengthen the magnetizing force, H, on one side of the core 40 and weaken it on the other. Consequently, the side being aided by the external field will reach saturation and its voltage will drop to zero before the weakened side does. During the short time interval that only one side of the core is saturated, the induced voltages in the detector windings 54 and 58 do not cancel each other, thus causing a voltage spike in the circuit of the detector windings. On the opposite half cycle of the ac excitation voltage, the opposite side of the core reaches saturation first. However, since the induced voltages are also reversed, the voltage spikes in the detector circuit maintain the same polarity on each half cycle of the ac excitation.

Because the polarity of the voltage spikes due to this uneven saturation does not reverse on alternate half cycles, these voltage spikes constitute even harmonics of the excitation frequency on the windings 44 and 48. Thus, the detector circuit is tuned to the second harmonic of the excitation frequency in order to receive a sinusoidal ac signal of twice the excitation frequency. The amplitude of this signal is a measure of the component of the external field intensity along the diametrical axis of symmetry of the sensing head.

Accordingly, it can be seen that when the magnetic reluctance bridge of FIG. 1 is unbalanced due to the proximity of a ferrous target. flux will flow in one direction through the center of the bridge and will cause an uneven saturation of the core 40. It can be seen that if the external magnetic component from the unbalancing of the reluctance bridge is reversed, the polarity of the spikes and the phase of the signal is also reversed.

The required excitation frequency, voltage, and current capability are interrelated with the magnetic properties of the ring core 40 and the number of turns on the excitation windings. In this regard, the saturation flux of the core (saturation flux density, $B_s$, times the cross-sectional of the core) determines the number of turns of wire needed on the excitation windings for operation at a given voltage and frequency. In the present design, the excitation voltage per turn is chosen to be such that the core reaches saturation about half way through each half cycle of the ac excitation voltage. For ac square wave excitation, this condition is satisfied when the number of turns is:

$$N = \frac{V \times 10^5}{8 f_o B_s A}$$

where:
- N = number of turns on each winding.
- V = excitation voltage on each winding,
- $f_o$ = frequency of ac square wave voltage,
- $B_s$ = saturation flux density of core material in kilogauss,
- A = cross-sectional area of the core in square centimeters.

For good performance of the sensing head, a sufficient magnetizing force, H must be generated when the maximum flux density, $B_s$, is reached in order to drive the core well into saturation. This magnetizing force is generated by the ampere-turns obtained when the voltage across the windings 54 and 58 drops to zero. This magnetizing force is limited by the current limiting resistors and determines the current capability required of the excitation source. For good results the limited current should produce a magnetizing force, H, which exceeds that required to reach saturation, as determined by the magnetic characteristics of the core material, by a large factor.

It is generally found to be advantageous to use a core 40 of a material that requires less of a magnetizing force, in order to reduce the ampere-turns necessary in the system. Although the present design utilized a core of Deltamax, it is estimated that the excitation power requirements could be considerable improved by the use of a core material such as Supermalloy. A proper choice of such core material would decrease the magnetizing force required thereby allowing a decrease in the number of turns on the excitation windings with a corresponding increase of the cross sectional area for increased signal strength.

Referring now to the construction of the core 40, a toroidal core wound from thin ribbons of nickel-iron alloys was utilized. Such cores are commercially available. The frequency $f_o$ utilized as the ac excitation frequency in the present design was 5 kHz. For operation at this excitation frequency, a tape thickness for the core of 1 mil or less is recommended. For ease of fabrication of the sensing head, the excitation and detector windings may be bifilar, but this method of winding is not essential, nor is it necessary that the detector windings have any prescribed number of turns. The signal voltage generated will increase with the number of turns on the detector windings. It should also be noted that although the two excitation windings 44 and 48 are connected to be driven in parallel for simplicity of coupling to a single ended source, this type of excitation connection is certainly not required.

Figure 3:
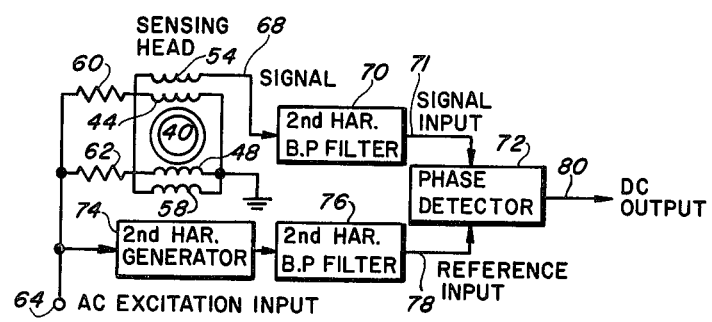
FIG. 3 is a block diagram of the overall phase sensitive magnetic proximity sensor of the present invention.

Referring now to FIG. 3, a block diagram of the overall proximity sensing system is shown. An ac signal excitation is applied via the input terminal 64 through two current limiting resistors 60 and 62 to their respective excitation windings 44 and 48. As noted previously, the detector windings 54 and 58 are connected in phase opposition such that when there is no external magnetic field to cause unbalanced saturation in the core 40, there will be no signal output on the line 68. However, when an external magnetic field through the core does unbalance the saturation times for the core windings, then voltage spikes at a frequency equal to the second harmonic of the ac excitation frequency will be generated on the line 68. This set of spikes at the second harmonic on the line 68 is then applied to a second harmonic bandpass filter 70. This filter is tuned to the second harmonic of $f_o$ and acts to generate a sign wave excitation only when the second harmonic is present on line 68.

As noted above, it is advantageous to be able to distinguish the sense of the field component as well as to indicate its amplitude so that it can be determined which side of the magnetic reluctance bridge has become unbalanced. In this regard, it can be seen that the signal on the line 68 will reverse its phase when the external field causing the unbalance in the core 40 is reversed. Accordingly, the sense of the field may be determined by phased detecting the second harmonic signal output on line 71. This phase detection is accomplished by applying the second harmonic from the second harmonic bandpass filter 70 as one input to a phase detector 72. A second harmonic generator 74 in combination with a second harmonic bandpass filter 76 is provided for generating a second harmonic reference signal from the ac excitation signal. This second harmonic reference signal on the line 78 is than applied to the reference input of the phase detector 72. The output of the phase detector will be a dc signal on the line 80.

Figure 4:
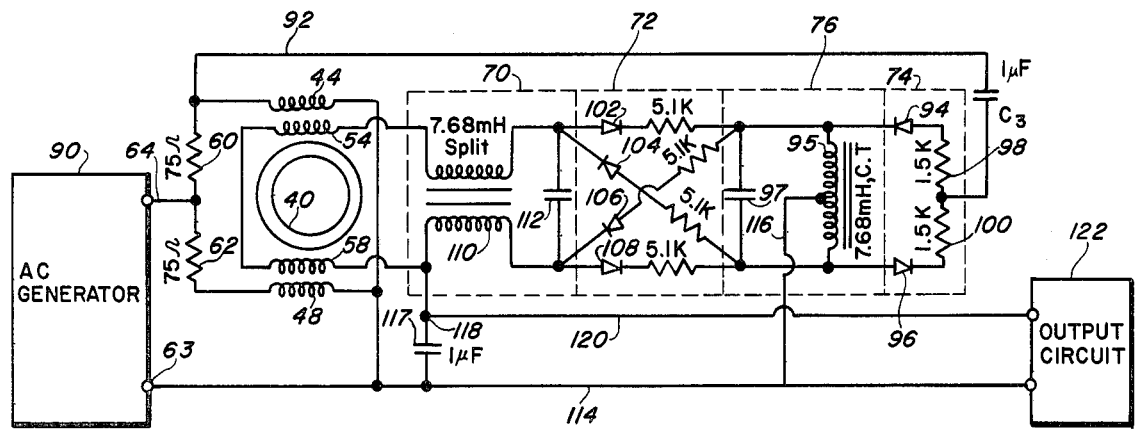
FIG. 4 is a schematic circuit diagram of the block diagram shown in FIG. 3.

A detailed schematic diagram of the circuit of FIG. 3 is shown in FIG. 4. An ac generator 90 applies a signal (in this case a square wave signal) through the two current limiting resistors 60 and 62 to the excitation windings 44 and 48. This ac excitation signal at the frequency $f_o$ is also applied via the line 92 to the second harmonic reference generator 74. Thus, in this circuit embodiment the second harmonic reference voltage is generated from the alternating voltage pulses across one of the excitation windings of the sensing core. Because saturation of the core occurs near the midpoint of each half cycle of the applied voltage from the ac generator (square wave oscillator), the width of these pulses is approximately one half cycle at the second harmonic frequency. The second harmonic generator 74 comprises two steering diodes 94 and 96. The second harmonic reference bandpass filter 76 comprises a balanced parallel resonant circuit tuned to the second harmonic of frequency $f_o$. In the figure, this parallel resonant tank circuit is formed by a center-tapped inductor 95 connected in parallel with a capacitor 97. Pulses of alternate polarities are applied through the steering diodes 94 and 96 to opposite sides of the balanced parallel resonant circuit 76. It can be seen that the phasing of the applied pulses from these steering diodes is such as to excite the parallel resonant tank circuit 76 at the second harmonic frequency. The resistors 98 and 100 in series with the steering diodes 94 and 96, respectively, prevent excessive loading of the tuning circuit 76.

The phase detecting circuit 72 is implemented, in this embodiment, simply by means of a double balanced diode ring demodulator comprising four appropriately connected diodes 102, 104, 106, and 108. The second harmonic reference signal is applied to one end of this double balanced diode ring demodulator 72.

The signal input from the detector coils 54 and 58 is applied to the phase detecting circuit or demodulator 72 via a balanced tuning filter which, in one embodiment, may comprise a split tuning inductor 110 and capacitor 112. As this tuning circuit 70 is connected, it is series driven by the detector windings 54 and 58 of the sensing head. In essence. the differentially connected detector windings 54 and 58 are connected in series with one side of the split tuning inductor while the capacitor 112 is connected in series to the other side of the tuning inductor. This series tuning of the signal not only provides an impedance transformation to increase the signal output voltage, but also gives the proper phase relationship with the ac reference signal in order to obtain a maximum dc output from the demodulator 72.

It can be seen from the circuit of FIG. 4, that the fundamental frequency ac current applied to the harmonic generator 76 is returned through the center tap 116 of the tuning inductor 95 to a line 114 which is designated common. Thus, the center tap acts also as the common or dc reference with which the detector output may be compared. Although the line 114 could be connected to a power supply common, the circuit design is simplified by referencing the dc detector output to a positive voltage level. A readily available voltage source for use as a dc reference is the series blocking capacitor 119, shown in FIG. 5, to be discussed next.

The output of the system is a signal on the line 120. The capacitor 117 functions to short out the ac sine wave at the point 118. Thus, the output signal on line 120 is a dc signal with a small ripple component. The dc signal on line 120 is applied to an output circuit 122 in conjunction with the dc reference signal on the line 114. This output circuit 122 functions to generate a trigger signal when the dc signal on the line 120 is above a certain voltage threshold value relative to voltage on line 114.

Although the present filter and demodulator design has been implemented with passive circuits for convenience, it can just as easily be implemented using active filters and an active phase detector. Such a design would eliminate the need for tuned transformers and inductors which must be wound to specification.

Figure 5:
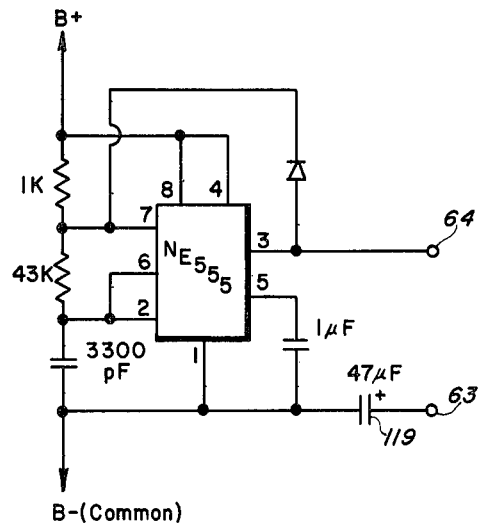
FIG. 5 is a schematic diagram of an ac generator which may be utilized in FIG. 4.

FIG. 5 is a schematic diagram of one circuit which may be utilized as the ac generator 90. The design shown in FIG. 5 utilizes an NE555 intergrated timer circuit made by Fairchild Corporation as a free running multi-vibrator to generate a square-wave excitation voltage. The values shown in the external biasing circuitry provide an operating frequency of 5 kHz and a duty cycle of 50%. Since the output of the NE555 is a train of dc pulses, a series blocking capacitor 119, noted previously, is used to prevent direct current from flowing in the excitation windings 44 and 48 of the sensing head. Thus, the dc component is dropped across the capacitor 119 and the voltage applied across the load (the excitation windings 44 and 48) and the current limiting resistors 60 and 62 is an alternating symmetrical square-wave of half the dc pulse voltage appearing on pin 3 of the NE555. It is recommended that this capacitor 119 be electrolytic in order to have a small reactance at the excitation frequency $f_o$ relative to the parallel resistance of the current limiting resistors 60 and 62 (FIG. 3). As noted previously, the series blocking capacitor 119 is placed in the circuit on the return side of the excitation windings as a convenient method of providing a dc reference or bias voltage for the detector circuit.

Figure 6:
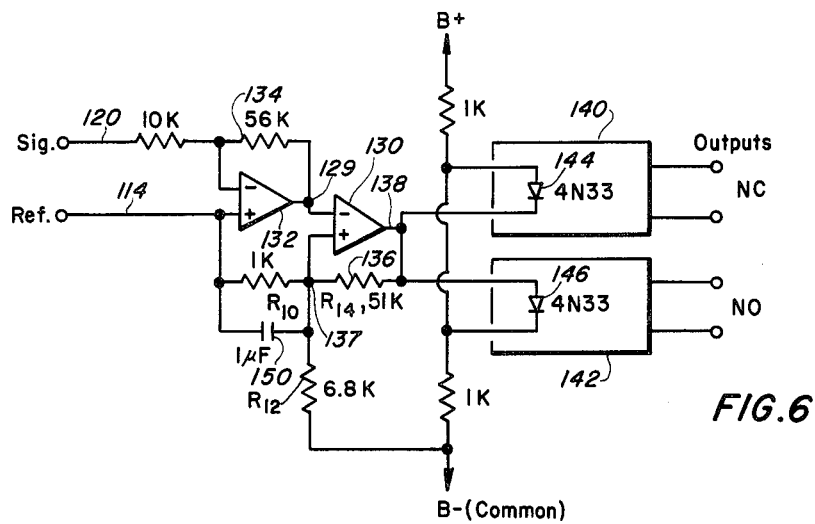
FIG. 6 is a schematic circuit diagram of the output triggering circuit which may be utilized in FIG. 4.

As noted above, the dc signal on line 120 activates the output circuit 122 whenever a ferrous target is within a predetermined range. The output circuit 122 essentially acts as a threshold level detector or triggering circuit which turns ON when the signal exceeds a level corresponding to the desired target range. Some hysteresis or backlash in the triggering circuit is desirable for noise immunity, i.e., the circuit should turn OFF at a lower input level than it turns on. FIG. 6 is a schematic diagram of one circuit embodiment which may be used to implement the output circuit 122. In that circuit a 741 operational amplifier 130 is utilized as the triggering circuit and the 4N33 opto-couplers 140 and 142 are used for the normally opened (NO) and normally closed (N.C.) output switches. A first dual 741 operational amplifier 132 is utilized to invert the incoming dc signal on line 120, and the gain therefrom is used to set a triggering sensitivity for the circuit.

Referring to the first op amp 132, negative feedback via the resistor 134 on the inverting input of the amplifier 132 makes this device a linear amplifier. The non-inverting input to the amplifier 132 is returned to the dc reference voltage via the line 114. In this particular design, it was found that a non-inverting configuration tended to pick up voltage spikes believed to originate in the sensing head. Use of the present inverting configuration allows the filtering of such spikes, if necessary, by the addition of a small integrating capacitor (not shown) across the feedback resistor 134.

As noted above, the operational amplifier 130 is the trigger for the circuit. This amplifier 130 is connected in a positive feedback configuration by means of the feedback resistor 136 connected between the output line 138 from amplifier 130 and the positive or non-inverting input to the amplifier. This positive feedback causes the output amplifier 130 to be latched either high or low depending on the input conditions thereto. In either condition of latching, the voltage applied to the non-inverting input of the amplifier 130 by the feedback resistance network is negative with respect to the dc reference voltage on the line 114. Thus, when a dc signal input from the output of amplifier 132 to the inverting input 129 of the amplifier 130 is zero or positive with respect to the reference voltage (indicating a zero or negative dc signal on the line 120), then the inverting input 129 is more positive in voltage than the voltage to the amplifier 130 non-inverting terminal. Thus, the voltage output of the amplifier 130 is negative, i.e. the output is latched low to the negative side of the power supply. This condition is the normal "OFF" state. When the output on line 138 from the amplifier 130 is negative, then the light emitting diode 144 in the opto-coupler 140 is biased into conduction. Likewise, the light emitting diode 146 in the opto coupler 142 is biased negative. Thus, the light emitting diode 144 will indicate a normally closed (NC) position.

Likewise, when the voltage to the inverting terminal of the amplifier 130 is negative by an amount which exceeds the negative voltage applied to the non-inverting input of the amplifier 130, then the amplifier 130 saturates positive and provides a positive output on the line 138. This situation occurs when there is a positive dc voltage on the line 120 (which is then inverted by amplifier 132). In essence, the output line 138 is now latched high to an voltage near the positive supply voltage. The high voltage on the line 138 biases the light emitting diode 144 into non-conduction, while biasing the diode 146 into conduction. Thus, the light emitting diode 146 indicates a normally open (NO) condition.

It should be noted that the positive feedback resistor 136 on the amplifier 130 provides "snap-action" switching by creating a hysteresis in the switching level. The hysteresis action of this circuit can be understood by noting that point 129 at the inverting terminal of the amplifier 130 must be more positive in voltage than the point 137 at the non-inverting terminal in order to turn the amplifier 130 off. However, the voltage at the non-inverting terminal 137 is dependent on whether the amplifier 130 output terminal 138 is ON (high) or OFF (low). It is less negative with respect to the reference voltage on line 114 when the amplifier 130 is ON than when it is OFF. Thus, after the amplifier 130 have been triggered ON, it will not turn OFF again until the signal level drops below a level somewhat less than the level that was required to trigger it ON. The magnitude of this hysteresis, i.e. the difference between the ON and OFF triggering voltages on line 129 is given by $$\Delta V = (V_h - V_L) R_p / R_{14}$$

where $V_h$ and $V_L$ are the high and low latched output voltages respectfully and $R_p$ is the parallel resistance of $R_{10}$, $R_{12}$, and $R_{14}$ shown in the figure. On the valid assumption that $R_p/R_{14}$ is much less than one, and that $\frac{1}{2}(V_H + V_1)$ is approximately equal to the dc reference voltage, the mid point between the ON and the OFF input triggering voltages is equal to the dividing ratio, $R_{10}/(R_{10} + R_{12})$, times the dc reference voltage.

As noted above, a ripple voltage originating on dc reference voltage line 114 appears equally on both the reference and the dc signal output lines 114 and 120. Since this ripple is a common mode input to the dc amplifier 132 it appears unamplified on the output of the amplifier. However, in the process of establishing the triggering level at the amplifier 130, an inequality of the two voltages is introduced by the voltage divider circuitry. Accordingly, an ac bypass capacitor 150 is connected across the resistor $R_{10}$ to equalize the ac ripple at both of the inputs of amplifier 130. For reliable operation of this circuit, the ac difference voltage between the two inputs should be small compared to the hysteresis.

From the foregoing description of the triggering circuit of FIG. 6, it can be seen that the output circuit is electrically isolated from the sensor circuitry. The parallel connection of the light emitting diodes 144 and 146 in reverse directions insures that whenever one opto-coupler is turned ON, the other opto-coupler is OFF. This reverse parallel connection also protects each of the diodes 144 and 146 from excessive reverse voltage.

A target which may be utilized with the above disclosed proximity sensor may be constructed using two parallel iron bars with horseshoe magnets attached across the backsides of the end of the bars to cause the bars to be of opposite polarity. When the bars are stood upright, they create a magnetic field component which may be disposed so it is parallel to the sensitive axes of the sensors 20 and 22. An additional horseshoe magnet may be spaced just beyond each end of the iron bars in order to abruptly reverse the field at the ends of the bars. With this target, the sensors are relatively insensitive to the distance of the sensors from the targets line of travel, while precisely indicating the ends of the target along that line by reversing the field direction.

The foregoing has disclosed a magnetic proximity sensor using dc or permanent magnetism for the detection of either non-magnetized ferrous targets or permanently magnetized targets. This dc magnetic proximity sensor has no moving parts and thus can be easily immunized against the effects of shock and vibration. Additionally, the device is unimpaired by dirt, paint, or grease. Moreover, unlike ac proximity sensors, this device can be made impervious to all but very low frequency electro magnetic radiation. Additionally, the source of the dc magnetic field can be made very strong as compared to ac source without the need to generate the field electronicially from a power source. Finally, it should be noted that the present design is sensitive to the sense as well as to the amplitude of the dc field. Consequently, this sensor can be used to indicate sharply defined positions along a magnetized targets line of travel where the field components sensed by the device reverses direction.

Obviously many modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. A proximity sensor for indicating the spatial proximity of a ferrous object comprising:
   a magnetic reluctance bridge including
      a dc magnetic field generating means including first and second magnetic poles with an axis of symmetry therebetween;
      a first high magnetic permeability ferrous section having first and second ends disposed in a non-touching manner across said first and second magnetic poles and balanced relative to said axis of symmetry;
      a first low magnetic permeabilty gap with a reluctance $R_1$ disposed between said first magnetic pole and said first end of said first ferrous section;
      a second low magnetic permeability gap with a reluctance $R_2$ disposed between said second magnetic pole and said second end of said first ferrous section;
      wherein said first and second magnetic poles, said first low magnetic permeability gap, said first ferrous section, and said second low magnetic permeability gap form a first magnetic flux circuit;
      a second high magnetic permeability ferrous section with third and fourth ends disposed in parallel with said first ferrous section a predetermined distance therefrom away from said first and second magnetic poles and balanced relative to said axis of symmetry;
      a third low magnetic permeability gap with a reluctance $R_3$ disposed between said first magnetic pole and said third end of said second ferrous section;
      a fourth low magnetic permeability gap with a reluctance $R_4$ between said magnetic pole and said fourth end of said second ferrous section;
      wherein said first and second magnetic poles, said third low magnetic permeability gap, said second ferrous section, and said fourth low magnetic permeability gap form a second magnetic flux circuit;

wherein said reluctances $R_1$, $R_2$, $R_3$, $R_4$ are related by the equation $R_1/R_2 = R_3/R_4$;

magnetic flux sensing element disposed approximately along said axis of symmetry between said first and second ferrous elements to form the center reluctance path for said magnetic reluctance bridge in order to sense flux when the magnetic reluctance bridge is unbalanced in reluctance;

wherein said first and third low magnetic permeability gaps overlap and are disposed on one side of said magnetic flux sensing element, and said second and fourth low magnetic permeability gaps over lap and are disposed on the opposite side of said magnetic flux sensing element from said first and third low magnetic permeability gaps;

wherein a ferrous object disposed adjacent either said third low magnetic permeability gap or said fourth low magnetic permeability gap will unbalance said magnetic reluctance bridge and cause flux to be detected by said sensing element; and means for generating a triggering signal in response to flux detected by said flux sensing element.

2. A proximity sensor as defined in claim 1, wherein said flux sensing element is a ring core flux gate magnetometer.

3. A proximity sensor as defined in claim 2, wherein said ring core flux gate magnetometer comprises:

a ring core;

an ac generator for generating a signal of frequency $f_o$;

at least two energizing coils wound symmetrically on said ring core so that the energizing coils are balanced with at least one energizing coil on each semicircular side of a desired axis of sensitivity through the core, said energizing coils connected to be driven by said ac generator; and at least two detecting coils wound symmetrically on said ring core so that the detecting coils are balanced with at least one detecting coil on each semicircular side of said desired axis of sensitivity through the core, said detecting coils being connected in phase opposition to said triggering signal generating means.

4. A proximity sensor as defined in claim 3, wherein said triggering signal generating means comprises:

a second harmonic bandpass filter tuned to the second harmonic of frequency $f_o$ for filtering the signal induced in said detecting coils;

a second harmonic generator connected to said ac generator for generating a reference second harmonic of frequency $f_o$;

a phase detector for detecting the phase of the signal output from said second harmonic bandpass filter with reference to said reference second harmonic and generating a dc output signal therefrom; and an output circuit for generating a trigger signal in response to said dc output signal.

5. A proximity sensor as defined in claim 1, wherein said triggering signal generating means includes means for generating a triggering signal only when the output signal from said magnetic flux sensing element has a desired sign.

* * * * *